(12) United States Patent
Gubert et al.

(10) Patent No.: US 6,712,318 B2
(45) Date of Patent: Mar. 30, 2004

(54) IMPACT RESISTANT SURFACE INSULATION TILE FOR A SPACE VEHICLE AND ASSOCIATED PROTECTION METHOD

(75) Inventors: Michael K. Gubert, Mission Viejo, CA (US); Daniel R. Bell, III, Westminister, CA (US); Duoc T. Tran, Huntington Beach, CA (US); Karrie Ann Hinkle, Aliso Viejo, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/994,330

(22) Filed: Nov. 26, 2001

(65) Prior Publication Data

US 2003/0213873 A1 Nov. 20, 2003

(51) Int. Cl.⁷ .................................................. B64G 1/58
(52) U.S. Cl. .................................... 244/158 A; 244/121
(58) Field of Search .............................. 244/158 A, 121

(56) References Cited

U.S. PATENT DOCUMENTS

| | | | | |
|---|---|---|---|---|
| 3,799,056 A | * | 3/1974 | Colignon | 244/117 A |
| 3,952,083 A | | 4/1976 | Fletcher et al. | |
| 4,093,771 A | | 6/1978 | Fletcher et al. | |
| 4,124,732 A | | 11/1978 | Leger | |
| 4,148,962 A | * | 4/1979 | Frosch et al. | 428/366 |
| 4,151,800 A | * | 5/1979 | Dotts et al. | 244/158 A |
| 4,198,454 A | * | 4/1980 | Norton | 428/117 |
| 4,338,368 A | * | 7/1982 | Lovelace et al. | 428/212 |
| 4,574,105 A | * | 3/1986 | Donovan | 428/474.9 |
| 4,664,967 A | * | 5/1987 | Tasdemiroglu | 428/220 |
| 4,767,656 A | * | 8/1988 | Chee et al. | 428/116 |
| 4,877,689 A | * | 10/1989 | Onstott | 428/607 |
| 4,923,741 A | | 5/1990 | Kosmo et al. | |
| 4,936,528 A | | 6/1990 | Butner et al. | |
| 4,991,799 A | | 2/1991 | Petro | |
| 5,038,693 A | * | 8/1991 | Kourtides et al. | 112/440 |
| 5,067,388 A | | 11/1991 | Crews et al. | |
| 5,079,082 A | | 1/1992 | Leiser et al. | |
| 5,102,723 A | * | 4/1992 | Pepin | 244/133 |
| 5,217,185 A | | 6/1993 | Rucker | |
| 5,377,935 A | | 1/1995 | Larriva et al. | |
| 5,425,973 A | | 6/1995 | Frangipane et al. | |
| 5,560,569 A | * | 10/1996 | Schmidt | 244/117 R |
| 5,569,427 A | | 10/1996 | Semenova et al. | |
| 5,601,258 A | | 2/1997 | McClymonds | |
| 5,626,951 A | | 5/1997 | Hogenson | |
| 5,705,012 A | | 1/1998 | Kolodziej et al. | |
| 5,772,154 A | | 6/1998 | Stewart | |
| 6,318,673 B1 | * | 11/2001 | Wolters | 244/158 R |

OTHER PUBLICATIONS

"Orbiter Thermal Protection System", NASA Facts, Mar. 1997, pp. 1–4.*

Orndoff, Evelyne, "PBO Fiber Blends: A Promise for the Future" p. 1.*

* cited by examiner

Primary Examiner—Michael J. Carone
Assistant Examiner—Stephen Holzen
(74) Attorney, Agent, or Firm—Alston & Bird LLP

(57) ABSTRACT

An impact resistant insulation tile is provided that is capable of withstanding the impact of Micrometeriods and Other Debris (MMOD). The tiles are secured to an exterior surface of a Reusable Launch Vehicle (RLV). A durable coating is applied to the exterior surface of a thermally insulative layer to fragment and slow down MMOD that collide with the tile. In addition, a shock layer may be embedded within the thermal insulator to further reduce the size and speed of MMOD particles. A ballistic strain isolator pad may also be located between the thermal insulator and the RLV structure to capture fragmented particles.

27 Claims, 1 Drawing Sheet

IMPACT RESISTANT SURFACE INSULATION TILE FOR A SPACE VEHICLE AND ASSOCIATED PROTECTION METHOD

FIELD OF THE INVENTION

The present invention relates to tile components that provide both thermal and impact protection for a reusable launch vehicle such as the space shuttle.

BACKGROUND OF THE INVENTION

A reusable launch vehicle (RLV), such as the space shuttle, repeatedly travels into or beyond the earth's upper atmosphere and then returns to the earth's surface. During flight, the RLV experiences extreme temperatures, ranging from −250° F. while in orbit to nearly 2500° F. upon reentry to the atmosphere. Because of the extreme temperatures, the vehicle and its contents must be protected by a thermal protection system.

Thermal protection systems for RLVs are constructed from a large number, usually several thousand, of insulation tiles. The tiles function to insulate the vehicle from the environment and to radiate and reflect heat from the vehicle. In addition to protecting the vehicle from environmental heat sources, the insulation tiles also provide protection from localized heating sources such as the vehicle's main engine, rocket boosters and directional thrusters. RLVs such as the space shuttle typically utilize a variety of tiles to cover the surface of the vehicle. Different areas of the vehicle encounter different heat profiles and different physical stresses during flight. Therefore, a variety of tiles having different compositions, densities, and coatings are placed at different positions of the vehicle depending on whether such positions are leeward or windward, upper or lower surfaces, etc.

The tile of a typical thermal protection system is shown in FIG. 1. The tile consists primarily of a thermal insulator 2, a relatively thick layer of material with an extremely low thermal conductivity. A typical thermal insulator material is Lockheed Insulation (LI), a light-weight fused silica fiber developed by Lockheed Missile and Space Company. LI is produced by mixing silica fibers having a diameter of 1 to 3 μm and deionized water in a V-blender to form a slurry. The slurry is mixed with ammonia and stabilized colloidal silica solution after which it is placed in a casting tower where it is dewatered and slightly pressed to remove a portion of the water. The partially dried slurry is heated to a temperature of 250° F. to remove the remaining residual water. The dried silica composition is then fired to a temperature of up to 2300° F., which causes the colloidal silica to sinter the silica fibers to one another. The resulting insulative material is a low density mass of randomly arranged fused silica fibers. By selectively dewatering and pressing the silica fiber slurry, various densities of the resulting dry silica material may be produced. Lockheed Insulation tiles are marketed under the trade names LI-900™, LI-1500™ and LI-2200™, having densities of 9 lb/ft³, 15 lb/ft³ and 22 lb/ft³, respectively.

Although relatively thick, the thermal insulator has a relatively low density and negligible resistance to Micrometeroids and Orbital Debris (NMOD). As a result, the thermal insulator provides insignificant protection in the event a particle collides with the RLV.

The exterior surface of the thermal insulator is covered with a thin, fragile outer coating 4, typically Reaction Cured Glass (RCG). RCG is produced by mixing fine ceramic powder in an alcohol solution and spraying this mixture onto the surface of the thermal insulator. After drying, the RCG-thermal insulator composite is heat cured at extreme temperature. The resulting product provides even greater thermal protection to the RLV than the thermal insulator alone. This outer coating is also very fragile and provides little protection from damage as a result of particles colliding with the RLV. Additional information on RCG may be found in U.S. Pat. No. 4,093,771 to Fletcher, et al, incorporated herein by reference.

The materials selected for both the thermal insulator and the outer coating are chosen for their extremely low thermal conductivity. As a result, they do not experience significant thermal expansion at elevated temperatures, nor do they experience significant thermal contraction at lower temperatures. In contrast, the RLV structure, typically aluminum, experiences significant expansion and contraction, up to thirty times that experienced by the thermal insulator, as a result of temperature variations. The RLV structure also undergoes relatively greater temporary distortion and deformation as a result of aerodynamic stresses than does the thermal insulator.

To accommodate for these differences in expansion and distortion, a Strain Isolator Pad (SIP) 6 is placed between the RLV 8 structure and the thermal insulator. The SIP is typically a flexible coated needled-felt Nomex™ material. The Nomex™ material provides excellent thermal characteristics and the needled-felt construction prevents tearing or damage during large lateral displacements. The SIP is bonded to both the RLV structure and the thermal insulator by any conventional method suitable for high temperature and high stress applications, such as the General Electric high temperature silicon adhesive RTV560.

Without the SIP, significant strain would develop at the interface between the thermal insulator and RLV structure, potentially causing damage to, or possibly loss of, the thermal insulation tile. Depending upon where the damaged or lost tile is located on the RLV, this could subject the RLV to an unacceptable risk of damage.

As stated previously, the primary purpose of the thermal protection system is to insulate the vehicle from the environment and to radiate and reflect heat away from the vehicle. Therefore, the components of the thermal protection system—the outer coating, the thermal insulator and the SIP—are not particularly resistant to mechanical damage, particularly mechanical damage due to MMOD. Collisions of this type are a serious concern because objects of sufficient mass and/or velocity that collide with the RLV can potentially penetrate the RLV structure and destroy critical systems, which may lead to loss of the RLV.

In past years, there have been relatively few RLV flights and those flights did not last long. Therefore, the risk of damage due to an MMOD collision was small. As the frequency and duration of RLV missions continues to increase, however, the probability of MMOD collisions, and the need for protection from such collisions, becomes greater. Current estimates predict a 50 percent increase in shuttle flights, from 10 per year to 15 per year, between 2002 and 2012. Further, techniques presently used to avoid potential collisions, such as maneuvering the RLV out of the path of incoming particles or changing the orientation of the RLV to minimize the potential for damage, may not always be available in the future. For example, when the RLV is supporting the International Space Station, the RLV's ability to maneuver and control its attitude will be limited. Therefore, it would be desirable to design a system that protects the RLV from both thermal and impact stresses.

This system should preferably be lightweight to minimize the launch weight of the RLV.

SUMMARY OF THE INVENTION

In light of the foregoing background, the present invention provides an impact resistant insulation tile, and an associated method of protection, which protects an RLV from both extreme temperatures and the impact of MMOD. The impact resistant insulation tiles may completely cover the RLV or may be strategically placed in certain areas that pose a greater risk to the RLV if damaged.

The impact resistant insulation tile of the present invention is designed to reduce the kinetic energy of MMOD that collide with the RLV, thereby reducing the risk of serious damage to the RLV. This is accomplished by incorporating a layer or layers of material within the tiles that are capable of breaking apart objects that collide with the RLV. This process not only reduces the mass of these objects, it also reduces their velocity. As a result, the kinetic energy of the objects is significantly reduced.

The impact resistant insulation tile includes a durable coating applied to a surface of a thermal insulator. MMOD that collide with the impact resistant insulation tile are broken into smaller particles and their velocity reduced by the durable coating. According to one embodiment of this invention, a shock layer is embedded within the thermal insulator. MMOD that penetrate the durable outer coating with sufficient energy will continue to travel through the thermal insulator and impact the shock layer. The shock layer further fragments the MMOD particles, reducing the threat of damage to the RLV. Preferably, the velocity of these smaller particles is reduced sufficiently to prevent them from traveling completely through the thermal insulator and reaching the RLV structure. The fragmented particles that do reach the RLV structure pose a significantly lower risk of serious damage due to their reduced mass and velocity.

The impact resistant insulation tile also includes a SIP positioned between the thermal insulator and the RLV to accommodate the dissimilar thermal and mechanical characteristics of the thermal insulator and the RLV. In one embodiment of this invention, a Ballistic Strain Isolator Pad (BSIP) capable of capturing fragmented particles is used. As such, the SIP of this embodiment also serves as another line of defense against MMOD or the like.

Therefore, the tile of the present invention not only thermally insulates the RLV during flight, but also advantageously protects the RLV from MMOD. In this regard, MMOD that impact upon the tile are fragmented by the tile and captured by the SIP before impacting the RLV, thereby potentially increasing the life of the RLV and reducing maintenance costs. As a result of its construction, the tile is generally lightweight so as not to unnecessarily add to the weight of the RLV. Although the tile of the present invention is most commonly used on an RLV, the superior thermal and impact resistance properties of the invented tile could be utilized in any myriad of applications requiring a low density, highly insulative material.

BRIEF DESCRIPTION OF THE DRAWINGS

Figure 1:
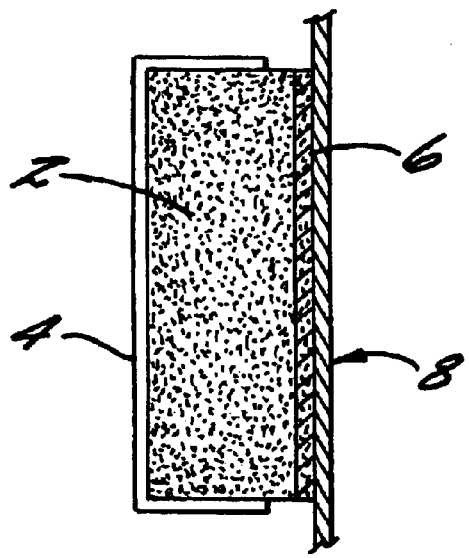
Figure 2:
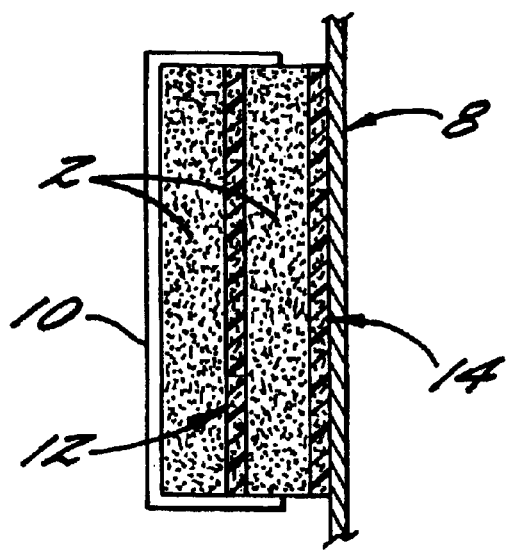

Having thus described the invention in general terms, reference will now be made to the accompanying drawings, which are not necessarily drawn to scale, and wherein:

FIG. 1 shows a prior art thermal protection system tile;

FIG. 2 shows an embodiment of the present invention in which a thermal protection system tile includes an embedded shock layer; and FIG. 3 shows embodiments of the present invention in which a thermal protection system tile includes a ballistic strain isolator pad.

DETAILED DESCRIPTION OF THE INVENTION

The present invention now will be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As previously stated, the RLV experiences extreme temperatures during flight, ranging from −250° F. while in orbit to nearly 2500° F. upon reentry to the atmosphere. Therefore, a thermal protection system is necessary to protect the RLV and critical systems from damage due to these extreme temperatures. It is also desirable to protect the RLV from MMOD. Impact resistant insulation tiles of the present invention provide both thermal and impact protection, thereby permitting longer continued use of the RLV with potentially less maintenance costs. The impact resistant insulation tiles of the present invention may cover all or a substantial majority of the external surface area of the RLV or they may be located only in key areas, such as near vital equipment, where the consequences of impact damage are more severe.

Referring now to FIG. 2, an impact resistant insulation tile design according to one embodiment of the present invention is depicted. The tile includes a thermal insulator 2, composed of a "next generation" thermal insulator, such as HTP (High Temperature Performance) tiles, or tiles composed of Alumina Enhanced Thermal Barrier (AETB), Fibrous Refractory Composite Insulation (FRCI), or Boeing Rigid Insulation (BRI).

HTP is a silica/alumina composite tile manufactured by Lockheed. AETB, manufactured by the National Aeronautics and Space Administration (NASA), is comprised of three small diameter ceramic fibers; silica fibers, aluminoborosilicate fibers, and alumina fibers, that are compacted and sintered together to form a lightweight, porous insulative material. AETB material is commonly marketed in the form of AETB-8 and AETB-16, having densities of 8 lbs/ft$^3$ and 16 lbs/ft$^3$, respectivley. FRCI, also manufactured by NASA, is a similar material comprised of silica, aluminoborosilicate and silicon carbide. Information on the production of AETB and FRCI may be found in Leiser et al., "Options for Improving Rigidized Ceramic Heatshields", *Ceramic Engineering and Science Proceedings*, 6, No. 7–8, pp. 757–768 (1985) and Leiser et al., "Effect of Fiber Size and Composition on Mechanical and Thermal Properties of Low Density Ceramic Composite Insulation Materials", NASA CP 2357, pp. 231–244 (1984), all incorporated herein by reference.

A durable outer coating 10 is applied to at least one surface, preferably the exterior surface, of the thermal insulator 2. This coating is typically RCG coating over Toughened Unipiece Fibrous Insulation (TUFI) coating. Like RCG, TUFI is produced by mixing fine ceramic powders in an alcohol solution. However, the ceramic particles used in the production of TUFI are significantly smaller than those used in RCG. As a result, TUFI more deeply permeates into the surface of the next generation thermal insulators such as AETB and FRCI, greatly improving the strength of the coating. Information on the production of TUFI may be found in U.S. Pat. No. 5,079,082 to Leiser et al, incorporated herein by reference.

Over this TUFI coating is applied a layer of RCG. This combination of materials provides not only improved thermal characteristics, like the RCG alone, but also improved toughness and durability, thereby improving the ability of the tile to fragment particles. Alternatively, a Ceramic Matrix Composite (CMC) may be used as the durable outer coating 10. CMC consists of a thin ceramic fabric impregnated with a ceramic matrix or resin and bonded onto a surface of the thermal insulator.

Objects which collide with this durable outer coating 10 are broken into smaller pieces that present a reduced risk of damage to the RLV 8. In addition, the velocity of these smaller particles is reduced, thereby further lowering the risk of damage to the RLV.

The impact resistant thermal insulation tile of this embodiment may also include a shock layer 12 embedded within the thermal insulator 2. The shock layer typically consists of a thin, highly porous ceramic fabric embedded in a ceramic resin or matrix. The fabric may be embedded either during or after fabrication of the thermal insulator. During fabrication, the ceramic fabric is placed within the slurry that eventually forms the thermal insulator. After fabrication, the thermal insulator is cut into two pieces in a plane parallel to its mounting surface. The ceramic fabric comprising the shock layer is then placed between these two pieces and all three are bonded together using a ceramic adhesive.

The shock layer is preferably located approximately halfway through the thickness of the thermal insulator, between the durable outer coating and the SIP, but may be located anywhere within the thermal insulator. The shock layer may be comprised of a single ply of material or multiple plies of material. Also, while the illustrated embodiment includes a single layer, the tile may include multiple shock layers. If multiple shock layers are used, it is preferred to distribute them throughout the thickness of the thermal insulator so that no shock layer is immediately adjacent another shock layer.

Following fragmentation of MMOD that impact the durable outer coating 10, some fragmented particles, and some particles of durable coating, may travel through the thermal insulator 2 and collide with the shock layer 12. The shock layer further fragments these particles, thereby further reducing both their mass and velocity. These even smaller and slower particles pose a considerably lower risk of damage to the RLV structure.

The RLV thermal protection system also includes a SIP 14 positioned between the interior surface of the thermal insulator 2 and the RLV 8. The SIP is attached to the RLV and accommodates for differences in expansion and deflection between the thermal insulator and the RLV as a result of thermal and aerodynamic stresses. A conventional SIP is generally made of a flexible needled-felt Nomex™ material. The Nomex™ material has demonstrated excellent thermal resistance against heat and the needled-felt construction accommodates large lateral displacement without tearing or damage.

After passing through the durable outer coating 10 and the embedded shock layer 12, some particles may have sufficient residual velocity to continue traveling through the thermal insulator 2 and impact the SIP 14. A conventional SIP as described above offers little protection to the RLV 8 from the particles that continue traveling through the thermal insulator. Therefore, yet another embodiment of the present invention utilizes an impact resistant insulation tile designed with a Ballistic Strain Isolation Pad (BSIP).

The BSIP 14, preferred embodiments of which are shown in FIG. 3, is highly resistant to damage caused by the impact of fragmented MMOD particles or other debris. Those fragmented particles with sufficient residual velocity to reach the BSIP are captured by it, thereby preventing damage to the RLV 8 structure. The BSIP has a core 20 composed of impact resistant material, such as p-phenylene benzobisoxazole, commonly known in the art as PBO felt. Alternatively, the core may be composed of poly-paraphenylene terephthalamide, commonly known as Kevlar®, or a combination of Kevlar® and PBO. The core is preferably a needled-felt construction that can accommodate the strain introduced by the dissimilar thermal and mechanical characteristics of the RLV structure and the thermal insulator.

Figure 3A:
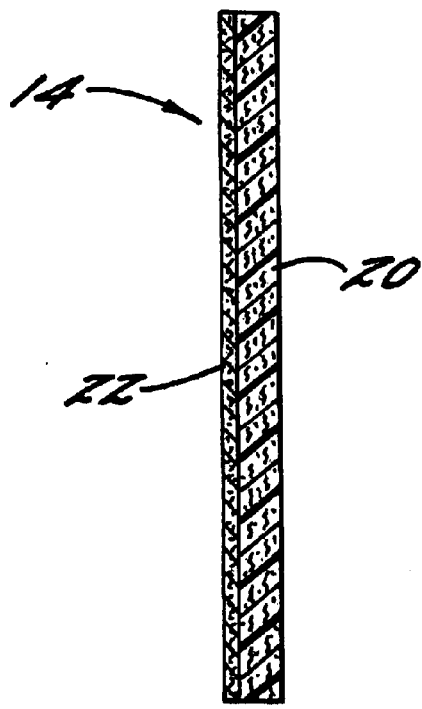
Figure 3B:
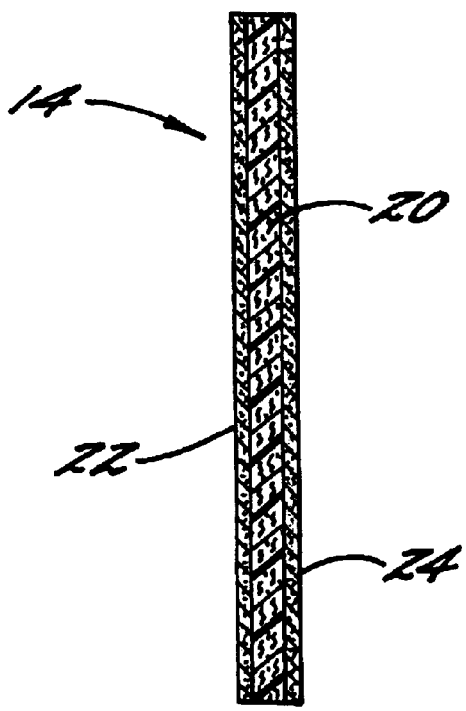

Attached to an exterior face of this PBO felt core 20, adjacent the thermal insulator 2, may be a fabric layer 22, depicted in FIG. 3a. The fabric layer may be PBO fabric, Kevlar® or a combination of Kevlar® and PBO. If both Kevlar® and PBO are used, PBO is preferably placed exterior to the Kevlar®, due to the superior temperature characteristics of PBO. The fabric layer may be either single ply or have multiple plies. As shown in FIG. 3b, an additional fabric layer 24 may also be attached to an interior surface of the PBO felt core, adjacent the RLV 8 structure. The fabric layers may be attached to the PBO felt core by bonding or stitching or other conventionally known methods.

Hypervelocity impact testing indicates that the impact resistant insulation tiles of the present invention are capable of withstanding up to 25 percent more impact energy than comparable prior art insulation tiles. According to analysis conducted by NASA-JSC, this results in a risk reduction of up to 35 percent for a typical 10-day Shuttle Orbiter mission.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. At least one tile secured to an exterior of a reusable launch vehicle (RLV) for protecting said RLV from thermal and impact stresses due to particle impacts as well as thermal stresses due to the ambient environment comprising:

a thermal insulator for shielding said RLV from ambient and impact thermal stresses, at least one outer coating disposed on an exterior surface of said thermal insulator for fragmenting particles upon impact, at least one embedded shock layer within and distinct from said thermal insulator for further fragmenting said particles, and a strain isolator pad disposed on an interior surface of said thermal insulator and attached to said space vehicle to accommodate for differences in expansion and deflection between said RLV and said tile as a result of thermal and aerodynamic loading.

2. The tile of claim 1, wherein said thermal insulator is comprised of a ceramic.

3. The tile of claim 1, wherein said outer coating is comprised of a ceramic matrix composite material.

4. The tile of claim 1, wherein said outer coating is a composite glass coating comprising reaction cured glass coating over a toughened unipiece fibrous insulation coating.

5. The tile of claim 1, wherein said at least one embedded shock layer is of a different composition than said outer coating.

6. The tile of claim 1, wherein said at least one embedded shock layer is made of a ceramic material having a density greater than the density of said thermal insulator.

7. The tile of claim 6, wherein said at least one embedded shock layer is multi-ply.

8. The tile of claim 6, wherein said at least one embedded shock layer comprises a single layer of ceramic material.

9. The tile of claim 6, wherein said at least one embedded shock layer comprises multiple layers of ceramic material.

10. The tile of claim 9, wherein said embedded shock layers are separated.

11. The tile of claim 1, wherein said at least one embedded shook layer is centered within said thermal insulator between said outer coating and said strain isolator pad.

12. The tile of claim 1, wherein said strain isolator pad is a ballistic strain isolator pad.

13. At least one tile secured to an exterior of an RLV for protecting said RLV from physical stresses due to particle impacts as well as thermal stresses due to the ambient environment and particle impacts comprising:
   a thermal insulator for shielding said RLV from ambient and impact thermal stresses,
   an outer coating disposed on an exterior surface of said thermal insulator for fragmenting particles upon impact, and
   a ballistic strain isolator pad disposed between said tile and said RLV to capture fragmented particles and to accommodate for differences in expansion and deflection between said RLV and said tile as a result of thermal and aerodynamic loading.

14. The tile of claim 13, wherein said ballistic strain isolator pad comprises a felt core and at least one fabric layer.

15. The tile of claim 14, wherein said felt core is comprised of p-phenylene benzobisoxazole.

16. The tile of claim 14, wherein said felt core is comprised of poly-paraphenylene terephthalamide.

17. The tile of claim 14, wherein said felt core is comprised of p-phenylene benzobisoxazole and poly-paraphenylene terephthalamide.

18. The tile of claim 14, wherein said fabric layer is comprised of p-phenylene benzobisoxazole.

19. The tile of claim 14, wherein said fabric layer is comprised of poly-paraphenylene terephthalamide.

20. The tile of claim 14, wherein said fabric layer is comprised of p-phenylene benzobisoxazole and poly-paraphenylene terephthalamide.

21. The tile of claim 14, wherein said at least one fabric layer is disposed on an exterior surface of said felt core adjacent said thermal insulator.

22. The tile of claim 14, wherein said at least one fabric layer is disposed on an interior surface of said felt core adjacent said RLV.

23. The tile of claim 14, wherein said at least one fabric layer comprises first and second fabric layers disposed on opposite surfaces of said felt core.

24. The tile as in claim 14, wherein said at least one fabric layer is single ply.

25. The tile as in claim 14, wherein said at least one fabric layer is multi-ply.

26. A method for protecting an RLV from physical stresses due to particle impacts as well as thermal stresses due to the ambient environment and particle impacts comprising:
   initially fragmenting particles upon impact with a protective tile;
   further fragmenting said initially fragmented particles following propagation through an intermediate medium;
   capturing said further fragmented particles; and
   thermally insulating RLV from thermal stresses due to the ambient environment and said fragmenting during fragmenting and capturing of said particles.

27. The method of claim 26, wherein said further fragmented particles travel through another intermediate medium prior to capture.

* * * * *